United States Patent
Kawamura

(10) Patent No.: US 12,163,850 B2
(45) Date of Patent: Dec. 10, 2024

(54) STRAIN GAUGE WITH BASE MEMBER HAVING PORTION NOT FIXED TO A MEASURED PORTION

(71) Applicant: DENSO WAVE INCORPORATED, Aichi-pref. (JP)

(72) Inventor: Tomohiro Kawamura, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 199 days.

(21) Appl. No.: 17/546,919

(22) Filed: Dec. 9, 2021

(65) Prior Publication Data

US 2022/0205855 A1   Jun. 30, 2022

(30) Foreign Application Priority Data

Dec. 9, 2020   (JP) .................................. 2020-204233

(51) Int. Cl.
  *G01L 1/22* (2006.01)
  *G01B 7/16* (2006.01)

(52) U.S. Cl.
  CPC ............. *G01L 1/2287* (2013.01); *G01B 7/16* (2013.01)

(58) Field of Classification Search
  None
  See application file for complete search history.

(56) References Cited

U.S. PATENT DOCUMENTS

| 8,175,821 B2 * | 5/2012 | Nagakubo ............... G01L 1/205 708/200 |
| 2020/0309622 A1 * | 10/2020 | Wade .................. A61B 5/02141 |

FOREIGN PATENT DOCUMENTS

| EP | 3566671 | * | 11/2019 |
| JP | H06-281511 A | | 10/1994 |
| JP | 2005-069402 A | | 3/2005 |
| JP | 2005069402 | * | 3/2005 |
| JP | 2018-185346 A | | 11/2018 |

* cited by examiner

*Primary Examiner* — Brandi N Hopkins
*Assistant Examiner* — Nigel H Plumb
(74) *Attorney, Agent, or Firm* — Oliff PLC

(57) ABSTRACT

A strain gauge has a mounting structure for mounting to a portion being measured. A base member of the strain gauge is partly fixed, by an adhesive, to the portion being measured. The base member includes a first base portion and a second base portion that are mutually separately positioned in a longitudinal direction, a resistance element being provided in the first base portion and a terminal being provided in the second base portion. The first base portion is fixed by a layer of adhesive to the portion being measured, and the layer of the adhesive is not provided on the second base portion such that the second base portion is not fixed to the portion being measured.

18 Claims, 4 Drawing Sheets

<COMPARATIVE EXAMPLE>

<COMPARATIVE EXAMPLE>

STRAIN GAUGE WITH BASE MEMBER HAVING PORTION NOT FIXED TO A MEASURED PORTION

CROSS-REFERENCE TO RELATED APPLICATIONS

This application is based on and claims the benefit of priority from earlier Japanese Patent Application No. 2020-204233 filed Dec. 19, 2020, the description of which is incorporated herein by reference.

BACKGROUND

Technical Field

The present disclosure relates to a strain gauge and a robot that detects strain occurring at a portion being measured of an object. More specifically, the present disclosure relates to a strain gauge having a mounting structure for use in mounting the strain gauge on a portion being measured, and a robot such as an industrial robot having the strain gauge.

Background Art

Various types of strain gauge are known. For example, a structure described in PTL 1 is known. The strain gauge described in PTL 1 includes an annular diaphragm and an annular boss formed integrally with the outer peripheral edge of the diaphragm, such that an end face of the annular diaphragm is continuous with an end face of the annular boss, forming a flat surface which extends in the same plane. In the strain gauge, a resistance wire is bonded to a portion of the flat surface on the diaphragm and a terminal for connecting the resistance wire to a lead wire is bonded to a portion of the flat surface on the boss (see PTL 1).

Unlike the case where a strain gauge is bonded to a bent surface, the strain gauge in PTL 1 can be securely bonded to a flat surface. With this mounting structure, a decrease in reliability caused by detachment of the strain gauge or the like can be prevented. Further, since the terminal is bonded to a portion of the flat surface on the boss, the terminal is not repeatedly subjected to elastic deformation and thus occurrence of a wire break can be prevented.

CITATION LIST

Patent Literature

PTL 1: JP 2005-69402 A

Technical Problem

However, the mounting structure of the strain gauge described in PTL 1 can only be applied to a configuration in which a portion being measured (diaphragm) and a portion which is not elastically deformable (boss) are adjacent to each other and form a flat surface. Accordingly, the applicable structures and applications are limited.

SUMMARY

It is thus desired to provide a strain gauge having a mounting structure capable of improving the durability and applicable to various configurations, and a robot on which the strain gauge is mounted.

Solution to Problem

A first configuration for solving the above problem is a strain gauge having a mounting structure for use in mounting the strain gauge on a portion being measured in a object being measured, the strain gauge including:

a base member having a film or plate form; a resistance element provided on the base member; a first wiring line provided on the base member and connected to the resistance element; a terminal provided on the base member and connected to the first wiring line; and a second wiring line connected to the terminal, wherein the base member includes a first base portion on which the resistance element is provided and a second base portion on which the terminal is provided, the first base portion being configured to be adhered to the portion being measured and the second base portion being configured not to be adhered to the portion being measured.

With this configuration, the strain gauge includes: a base member; a resistance element provided on the base member; a first wiring line provided on the base member and connected to the resistance element; a terminal provided on the base member and connected to the first wiring line; and a second wiring line connected to the terminal. The base member includes a first base portion on which the resistance element is provided, and the first base portion is adhered to the portion being measured.

Accordingly, the resistance element provided on the first base portion can be deformed according to the strain of the portion being measured. Therefore, a resistance value of the resistance element can be measured via the second wiring line connected to the terminal to measure the strain of the portion being measured based on a change in the resistance value of the resistance element. Moreover, since components of the strain gauge can be combined on a single base member, the strain gauge can be easily handled.

The base member further includes a second base portion on which the terminal is provided, and the second base portion is not adhered to the portion being measured. Accordingly, even when the portion being measured undergoes strain, the terminal provided on the second base portion can be prevented from being deformed. Therefore, the terminal can be prevented from being repeatedly subjected to a stress, preventing occurrence of damage at the boundary between the terminal and the second wiring line. Moreover, since it is not necessary to adhere the second base portion to a region adjacent to the portion being measured, a configuration of a region adjacent to the portion being measured may have high degree of freedom. Accordingly, a mounting structure of the strain gauge capable of improving durability and applicable to various configurations and applications can be provided.

According to a second configuration, the first wiring line extends from the resistance element, and the terminal extends from the first wiring line in a predetermined direction. In the predetermined direction, a length of the first wiring line is larger than a length of the terminal.

With this configuration, the first wiring line extends from the resistance element, and the terminal extends from the first wiring line in a predetermined direction. Accordingly, the first wiring line and the terminal can be drawn out from the resistance element in the predetermined direction. In the predetermined direction, a length of the first wiring line is larger than a length of the terminal. Therefore, a portion of the base member on which the first wiring line is provided (hereinafter, referred to as a "third base portions") can suppress propagation of strain occurring in the portion being measured to the second base portion via the base member.

According to a third configuration, a length of the resistance element is greater than a length of the terminal in the predetermined direction, and a length of the first wiring line is larger than a length of the resistance element in the predetermined direction.

With this configuration, a length of the first wiring line is larger than a length of the resistance element (>length of the terminal) in the predetermined direction. Therefore, the third base portion can effectively suppress propagation of a strain which has occurred in the portion being measured to the second base portion via the base member. Further, in adhesion of the first base portion to the portion being measured using an adhesive, even when the adhesive extends outside the first base portion, the third base portion can prevent the adhesive from reaching the second base portion, and thus prevent the second base portion from being adhered to the object being measured.

According to a fourth configuration, an object being measured constituting the portion being measured extends from the portion being measured to a position facing the second base portion, and the second base portion abuts the object being measured. In such a configuration as well the same effect as that described in the first configuration can be achieved since the second base portion is not adhered to the object being measured (that is, a member to be measured).

According to a fifth configuration, a predetermined space is provided between the object being measured constituting the portion being measured and the second base portion. With this configuration, the predetermined space can be effectively used.

When the terminal is provided on a surface of the base member which faces the portion being measured, the object being measured may interfere with connection of the second wiring line to the terminal.

In this regard, according to a sixth configuration, which is based on the fifth configuration, the terminal may be provided on a surface of the base member which faces the portion being measured. With this configuration, since the predetermined space is formed between the object being measured and the second base portion on which the terminal is provided, it is possible to prevent the object being measured from interfering with connection of the second wiring, line to the terminal.

Specifically, according to a seventh configuration, which is based on any one of the first to sixth configurations, the terminal may be connected to the second wiring line via a solder. With this configuration, since the terminal can be prevented from being repeatedly subjected to a stress, it is possible to prevent occurrence of cracking in the solder or cracking at the boundary between the terminal and the solder.

Specifically, an eighth configuration is a robot including the strain gauge having the mounting structure described in any one of the first to seventh configurations.

DESCRIPTION OF THE EMBODIMENTS

With reference to the drawings, an embodiment of an industrial robot and a strain gauge provided at a joint of an arm of the robot will be described.

A controller (control unit) of the robot detects a resistance value of a metal foil made of a resistive material (hereinafter, simply referred to as a resistance element) provided in the strain gauge, and measures strain occurring in a portion being measured based on a change in the resistance value. Based on the measured strain, the controller calculates torque acting on the joint of the robot. That is, the strain gauge is used as a torque sensor that detects torque. The method of calculating torque is well known, and the detailed description thereof will be omitted. The robot may also be a humanoid robot.

Figure 1:
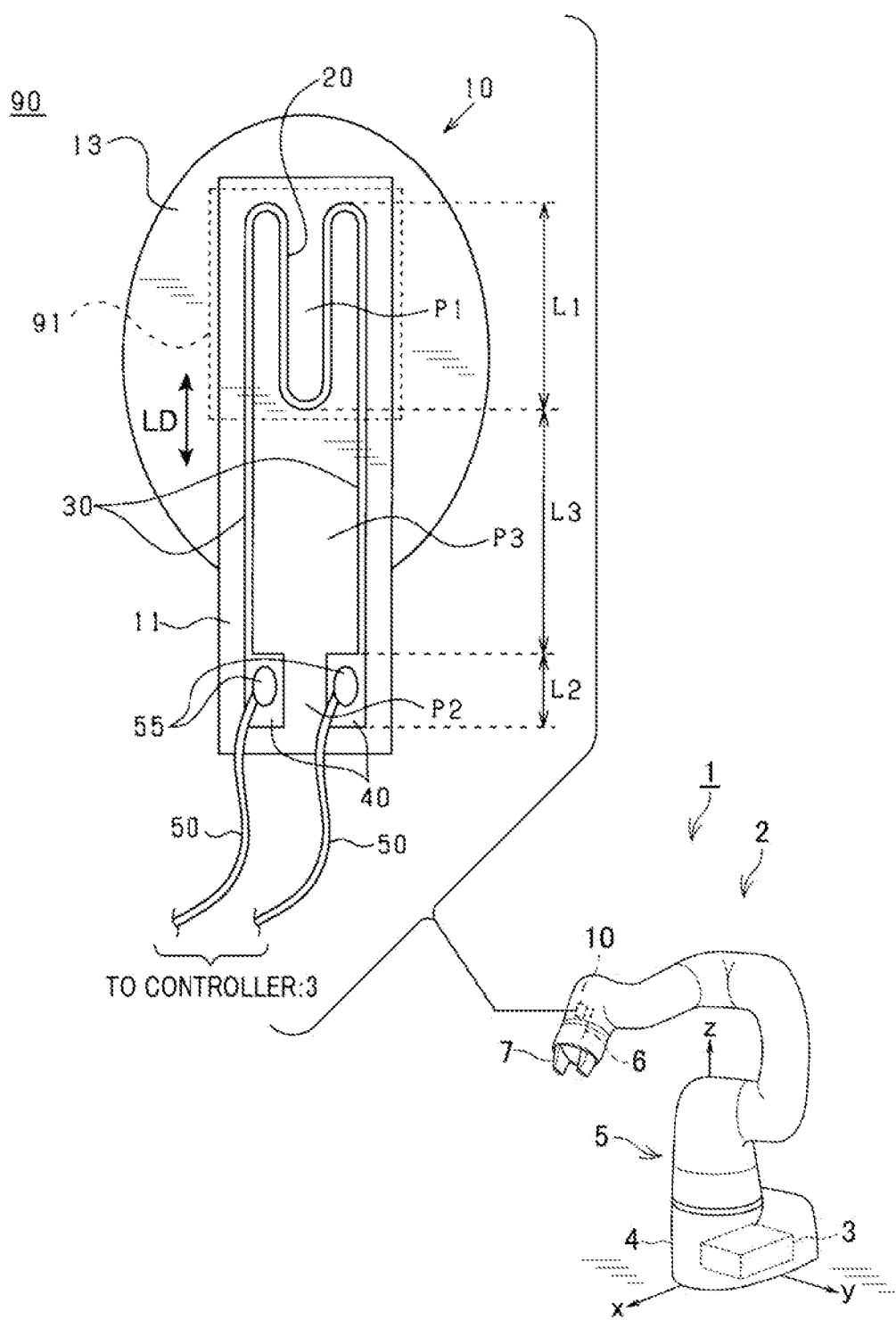
FIG. 1 is a plan view of a mounting structure of a strain gauge.

FIG. 1 illustrates a robot system 1. The robot system 1 includes a 6-axis vertically articulated robot 2 as a vertical multi-articulated robot, and a controller 3 that controls the movement of the robot 2. The robot 2 includes a base 4 and a multi-articulated arm element 5 disposed on the base 4. The multi-articulated arm element 5 has first to fifth shafts (joints) and a sixth shaft (joint) 6 which is rotatably provided at a distal end of the arm element 5. A hand 7 is rotatably connected to the sixth shaft 6. A strain gauge 10 is disposed on, for example, a part (portion being measured) of the joint which provides the sixth shaft 6 (object being measured). Further, another example of mounting of a strain gauge is described in JP 2019-144236 A. According to the example, a strain gauge may be disposed on a part of a torque transducer to which a motor for the joint is connected.

It should be noted that the robot 2 is not limited to a 6-axis vertically articulated type, and may also be other types. Further, the strain gauge 10 may not necessarily be disposed at a joint of the sixth shaft, and may also be disposed at other joints. Each shaft may have a corresponding motor (not shown) which serves as a driving source.

Figure 2:
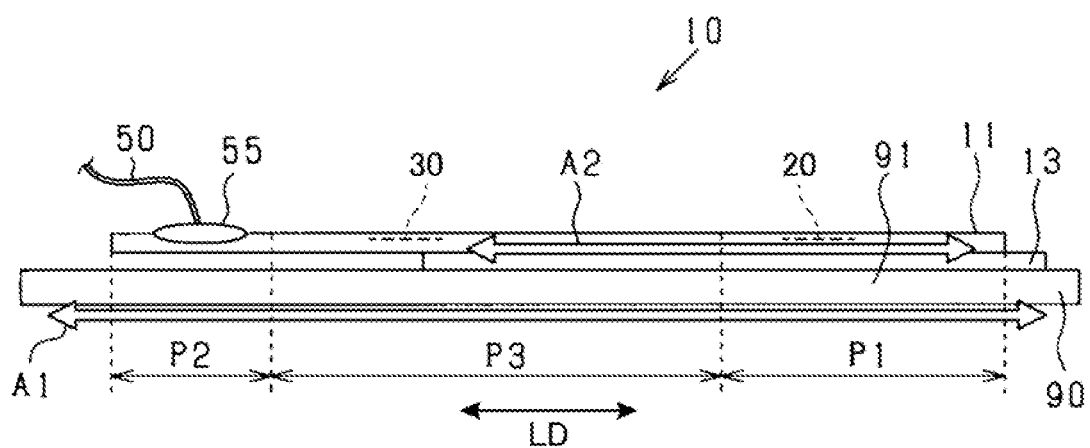
FIG. 2 is a side view of a mounting structure of a strain gauge.

As shown in FIGS. 1 and 2, the strain gauge 10 is configured to output a change in electrical resistance corresponding to the strain occurring in a portion being measured 91 of a object being measured 90, such as the joint 6 of the arm element 5 of the robot 2. The strain gauge 10 is electrically connected to a measurement circuit (not shown) of the controller 3, and measures strain by using the measurement circuit.

The illustrated strain gauge 10 includes a film 11, a resistance element 20 (such as a metal foil), a printed wiring line 30, printed terminals 40, wires 50, solders 55 and the like. In FIG. 2, the resistance element 20, the printed wiring line 30 and the printed terminals 40 are omitted.

A film 11 (base member) is made of, for example, polyimide (insulating resin) and has a rectangular shape.

The resistance element 20 is made of a resistive material and formed (provided) in a predetermined pattern (shape) on an upper surface (first surface) of the film 11. The resistance element 20 is formed in a region occupying a partial area of the film 11 on one end in a longitudinal direction LD.

The printed wiring line 30 (first wiring line) is made of a resistive material or a conductive material, and formed (provided) in a straight shape on the first surface of the film 11. The printed wiring line 30 is connected to the resistance element 20 and extends therefrom from one end toward the other in the longitudinal direction of the film 11 (predetermined direction).

The printed terminals 40 (terminals) are made of a resistive material or a conductive material, and formed (provided) on the first surface of the film 11. The printed terminals 40 are connected to the printed wiring line 30 and extend therefrom from one end toward the other in the longitudinal direction of the film 11 (predetermined direction).

In the longitudinal direction of the film 11, a length L1 of the resistance element 20 is larger than a length L2 of the printed terminal 40. In the longitudinal direction of the film 11, a length L3 of the printed wiring line 30 is larger than each of the length L2 of the printed terminal 40 and the length L1 of the resistance element 20.

The wire 50 (second wiring line) is made of a conductive material in a line shape. Each wire 50 is connected to the printed terminal 40 via the solder 55.

The film 11 includes a first film portion P1 (which constitutes a first base portion) on which the resistance element 20 is formed in a zig-zag (meandering) shape. The first film portion P1 has a length in the longitudinal direction LD, which encompasses a gauge length. The first film portion P1 is adhered (bonded) to the portion being measured 91 via, for example, a heat-curable resin 13 (adhesive) provided on a surface of the first film portion P1. The film 11 further includes a second film portion P2 (which constitutes a second base portion), as shown in the figure, located on an end opposite to that having the first film portion P1 in the longitudinal direction LD. The first film portion P1 of the film 11 is continuous to the second film portion P2 in the longitudinal direction LD via a third film portion P3 (which constitutes a third base portion) located therebetween. The third film portion P3 is provided as a buffer against vibration or the like.

The object being measured 90 constituting the portion being measured 91 extends from the portion being measured 91 to a position facing the second film portion P2. That is, a surface of the object being measured 90 which faces the first film portion P1, the third film portion P3 and the second film portion P2 is located on the same plane.

The second film portion P2 of the film 11 on which the printed terminals 40 are formed is not adhered to the object being measured 90 such as the joint 6 (that is, a member to be measured). That is, the second film portion P2 is not fixed to the object being measured 90.

The first film portion P1 and a part of the third film portion P3 of the film 11 on which the printed wiring line 30 is formed are adhered to the object being measured 90 via the heat-curable resin 13, while the second film portion P2 is not adhered to the object being measured 90.

The heat-curable resin 13 can adhere only the first film portion P1 to the object being measured 90, but may sometimes extend outside the first film portion P1. In this case, the heat-curable resin 13 may adhere the third film portion. P3 in part to the object being measured 90. Since the film 11 is flexible, the second film portion P2 actually abuts the object being measured 90. It should be noted that the second film portion P2 may not necessarily abut the object being measured 90.

In the mounting structure of the strain gauge 10 having the above configuration, strain occurs in the object being measured 90, for example, as indicated by the arrow A1 as the robot operates. Accordingly, strain also occurs in a portion of the film 11 adhered to the object being measured 90 via the heat-curable resin 13 as indicated by the arrow A2. This causes the resistance element 20 (for example, metal foil) formed in the first film portion P1 to deform, which changes the resistance value of the resistance element 20. The controller 3 of the robot 2 includes, for example, a bridge circuit (not shown), which measures the resistance value of the resistance element 20. The controller 3 measures strain of the portion being measured 91 based on a change in the resistance value. Based on the measured strain, the controller 3 measures a torque acting on the joint 6 of the robot 2.

The second film portion P2 is not adhered to the object being measured 90. Therefore, even when the object being measured 90 has strain as indicated by the arrow A1, the strain does not propagate to the second film portion P2. In addition, due to the third film portion P3 being provided between the first film portion P1 and the second film portion P2 as a buffer, the strain is effectively prevented from propagating to the second film portion P2. As a result, a stress is prevented from repeatedly acting on the second film portion P2.

Figure 3:
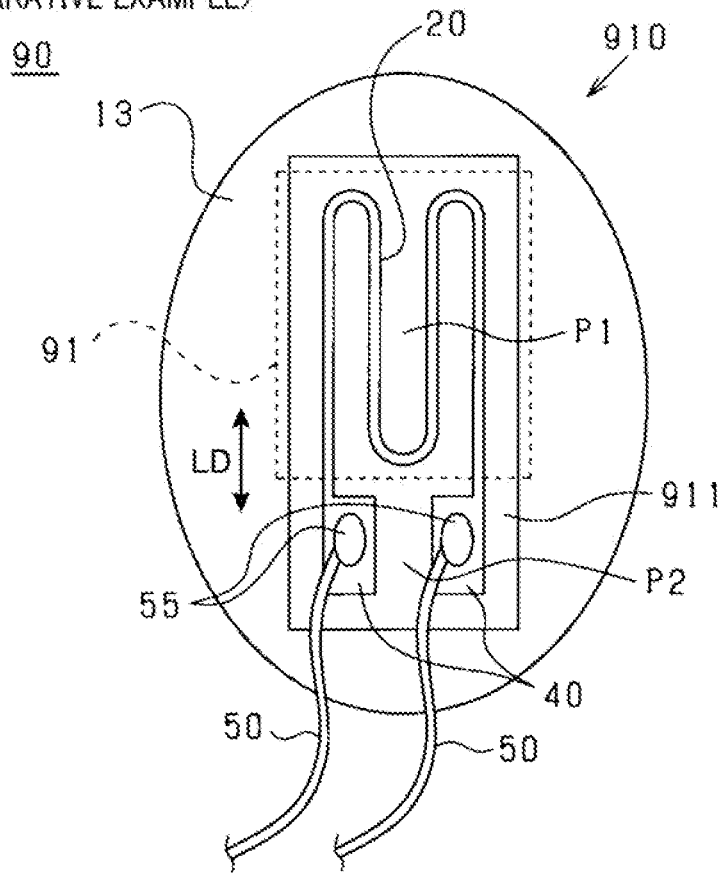
FIG. 3 is a plan view of a comparative example of a mounting structure of a strain gauge.
Figure 4:
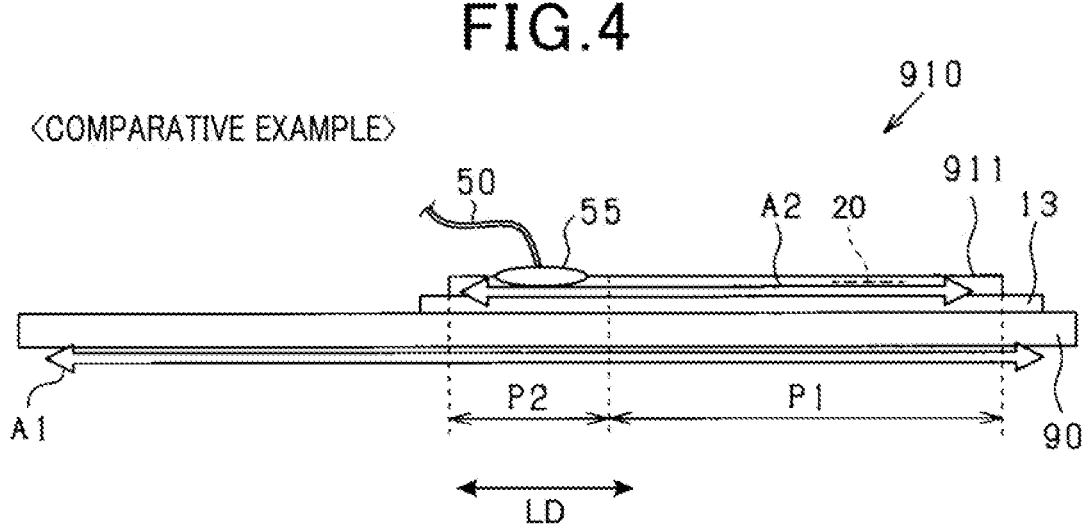
FIG. 4 is a side view of the comparative example of a mounting structure of a strain gauge.

FIG. 3 is a plan view of a comparative example of a mounting structure of a strain gauge, and FIG. 4 is a side view of the comparative example of a mounting structure of a strain gauge. The same components as those in FIGS. 1 and 2 are denoted by the same reference numerals.

A film 911 of a strain gauge 910 does not include the third film portion P3 described above. The strain gauge 910 does not include the printed wiring line 39 described above. Further, the resistance element 20 is connected to the printed terminals 40.

The first film portion P1 and the second film portion P2 are adhered to the object being measured 90 via the heat-curable resin 13. That is, the entire film 911 is adhered to the object being measured 90 via the heat-curable resin 13.

As the robot operates, strain occurs in the object being measured 90 as indicated by the arrow A1. Accordingly, strain also occurs in the entire film 911 as indicated by the arrow A2. As a result, a stress repeatedly acts on the second film portion P2, which may cause cracking in the solders 55 or cause cracking at the boundary between the printed terminal 40 and the solder 55.

The present embodiment which has been described in detail has the following advantages over the comparative example described above.

The first film portion P1 of the film 11 on which the resistance element 20 is provided is adhered to the portion being measured 91. Therefore, the resistance element 20 provided on the first film portion P1 can be deformed according to the strain of the portion being measured 91. Accordingly, a resistance value of the resistance element 20 can be measured via the wire 50 connected to the printed terminal 40 to measure the strain of the portion being measured 91 based on a change in the resistance value of the resistance element 20. Moreover, since components of the strain gauge can be gathered on a single film 11, the strain gauge 10 can be easily handled.

The second fil portion P2 of the film 11 on which the printed terminal 40 is provided is not adhered to other member (that is, object being measured 90). Therefore, even when the portion being measured 91 has strain, the printed terminal 40 provided on the second film portion P2 can be prevented from being deformed. Therefore, the printed terminal 40 can be prevented from being repeatedly subjected to a stress, preventing occurrence of damage at the boundary between the printed terminal 40 and the wire 50. Since it is not necessary to adhere the second film portion P2 to a region adjacent to the portion being measured 91, a configuration of a region adjacent to the portion being measured 91 may have high degree of freedom. Accordingly, a mounting structure of the strain gauge 10 capable of improving durability and applicable to various configurations can be provided.

The printed wiring line 30 extends from the resistance element 20, and the printed terminal 40 extends from the printed wiring line 30 in a predetermined direction. Accordingly, the printed wiring line 30 and the printed terminal 40 can be drawn out from the resistance element 20 in the predetermined direction. In the predetermined direction, the length L3 of the printed wiring line 30 is larger than the length L2 of the printed terminal 40. Therefore, the third film portion P3 of the film 11 on which the printed wiring line 30 is provided can suppress propagation of a strain which has occurred in the portion being measured 91 to the second film portion P2 via the film 11.

In the predetermined direction, the length L3 of the printed wiring line 30 is larger than the length L1 of the resistance element 20 (>length L2 of the printed terminal 40). Therefore, the third film portion P3 of the film 11 can effectively suppress propagation of a strain which has occurred in the portion being measured 91 to the second film portion P2 via the film 11. Further, in adhesion of the first film portion P1 to the portion being measured 91 using the heat-curable resin 13, even when the heat-curable resin 13 extends outside the first film portion P1, the third film portion P3 can prevent the heat-curable resin 13 from reaching the second film portion P2, and thus prevent the second film portion P2 from being adhered to the object being measured 90, The object being measured 90 constituting the portion being measured 91 extends from the portion being measured 91 to a position facing the second film portion P2, and the second film portion P2 abuts the object being measured 90. In such a configuration as well, the effects described above can be achieved since the second film portion P2 is not adhered to the object being measured 90.

The printed terminal 40 is connected to the wire 50 via the solder 55. As described above, the printed terminal 40 can be prevented from being repeatedly subjected to a stress. Accordingly, it is possible to prevent occurrence of cracking in the solder 55 or cracking at the boundary between the printed terminal 40 and the solder 55.

The above embodiment can be implemented with the following modifications. The same components as those of the above embodiment are denoted by the same reference numerals, and the description thereof will be omitted.

Figure 5:
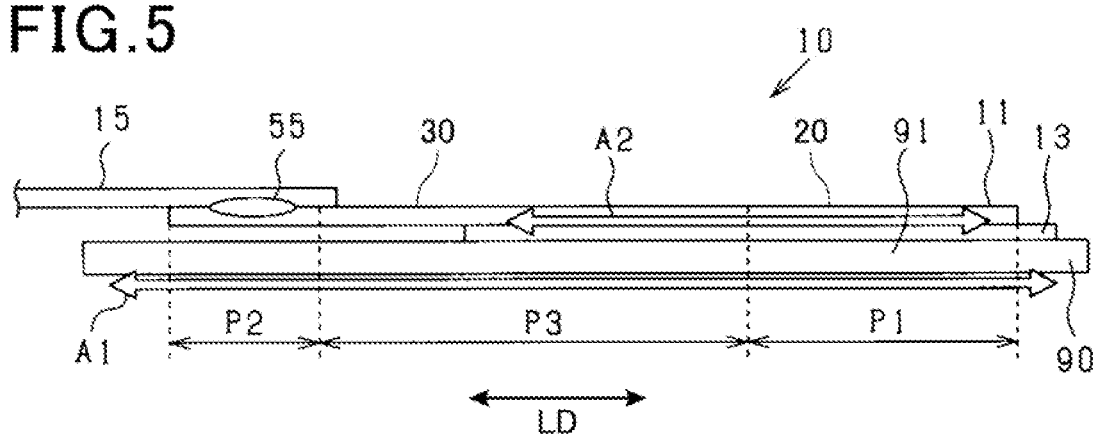
FIG. 5 is a side view of a modification of a mounting structure of a strain gauge.

As shown in FIG. 5, a printed terminal (not shown) formed on a flexible printed circuit 15 (printed circuit board) may be connected to the printed terminal 40 via the solder 55 or the like.

Figure 6:
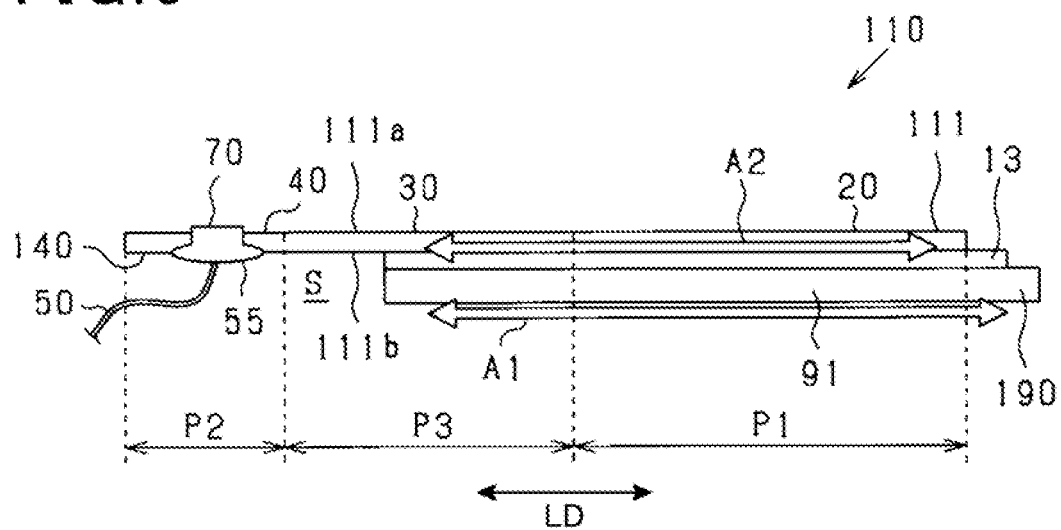
FIG. 6 is a side view of another modification of a mounting structure of a strain gauge.

As shown in FIG. 6, a predetermined space S may be formed between an object being measured, 190, constituting the portion being measured 91 and the second film portion P2. With this configuration, the predetermined space S can be effectively used. In a strain gauge 110, the resistance element 20, the printed wiring line 30, and the printed terminal 40 are disposed on a surface 111a of a film 111 located on a side opposite to a surface 111b which faces the portion being measured 91. On the other hand, a printed terminal 140 is disposed on the surface 111b of the film 111 which faces the portion being measured 91. Further, the printed terminal 40 and the printed terminal 140 are connected to each other via a conductive member 70 which penetrates the film 111.

According to the above configuration, since the predetermined space S is formed between the object being measured, 190, and the second film portion P2 on which the printed terminal 140 is provided, it is possible to prevent the object 190 from interfering with connection of the wire 50 to the printed terminal 140.

Figure 7:
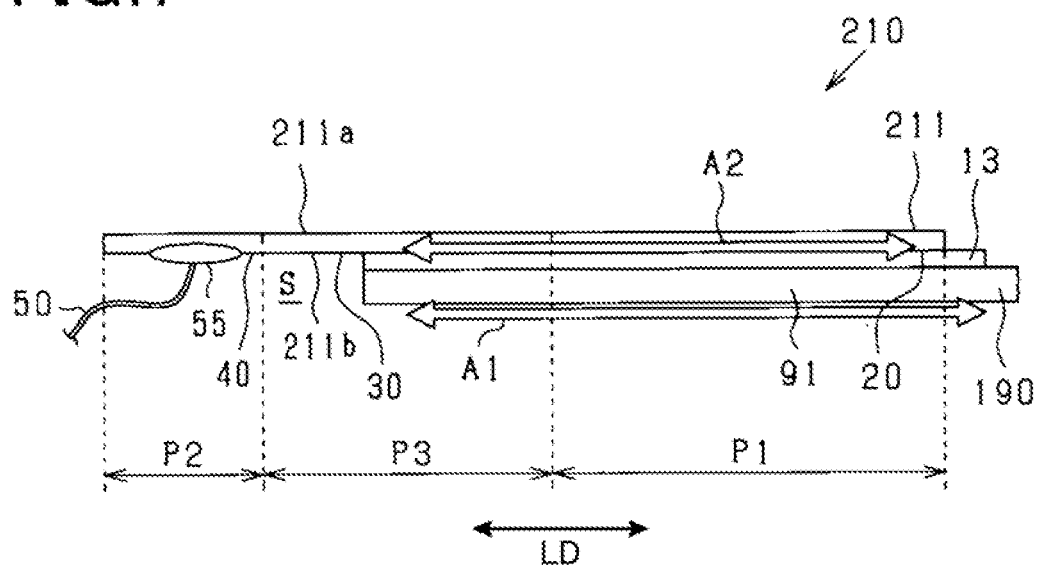
FIG. 7 is a side view of still another modification of a mounting structure of a strain gauge.

As shown in FIG. 7, a predetermined space S is formed between the object being measured 190 constituting the portion being measured 91 and the second film portion P2. The resistance element 20, the printed wiring line 30, and the printed terminal 40 are disposed on a surface 211b of a film 211 which faces the portion being measured 91. Further, the surface 211b of the film 211 is adhered to the object 190 via the heat-curable resin 13.

According to the above configuration, since the predetermined space S is formed between the object 190 and the second film portion P2 on which the printed terminal 40 is provided, it is possible to prevent the object 190 from interfering with connection of the wire 50 to the printed terminal 40. In the strain gauge 210, the resistance element 20 (first film portion P1) and the printed wiring line 30 (third film portion P3) may be covered with a cover layer made of polyimide or the like. Furthermore, in the aforementioned embodiment as well, the resistance element 20 (first film portion P1) and the printed wiring line 30 (third film portion P3) may be covered with a cover layer made of polyimide or the like.

The first film portion P1 may also be adhered (bonded) to the portion being measured 91 via an adhesive tape or the like.

The base member may also be formed of a plate-like substrate, instead of the films 11, 111 and 211.

The printed wiring line 30 is not limited to a straight shape, and may also be formed in a curved shape. In this case as well, the second film portion P2 of the films 11, 111 and 211 on which the printed terminals 40 and 140 are provided, may not be adhered to the object being measured 90 except for the wire 50. That is, the second film portion P2 may not be fixed to the object being measured 90.

The mounting structure of the strain gauges 10, 110 and 210 can be applied not only to industrial robots and humanoid robots, but also to other industrial machines and general machinery. Further, the mounting structure of the strain gauges 10, 110 and 210 can be applied to speed reducers and motors. Further, the strain gauges 10, 110 and 210 can be used not only as a torque sensor, but also as a force sensor.

PARTIAL REFERENCE SIGNS LIST

10: strain gauge
11: film (base member)
13: heat-curable resin (adhesive)
20: resistance element
30: printed wiring line (first wiring line)
40: printed terminal (terminal)
50: wire (second wiring line)
55: solder 90: object being measured
91: portion being measured
110: strain gauge
111: film (base member)
140: printed terminal (terminal)
190: object being measured
210: strain gauge
211: film (base member)
910: strain gauge
911: film

What is claimed is:

1. A strain gauge having a mounting structure for mounting the strain gauge on a portion being measured to detect strain occurring in the portion being measured, the strain gauge comprising:
   a base member having a film or plate form;
   a resistance element provided on the base member;
   a first wiring line provided on the base member and connected to the resistance element;
   a terminal provided on the base member and connected to the first wiring line; and
   a second wiring line connected to the terminal, wherein
   the base member is partly fixed, by an adhesive and in the longitudinal direction of the portion being measured, to the portion being measured, and
   the base member includes a first base portion and a second base portion that are mutually separately positioned in the longitudinal direction, the resistance element being provided in the first base portion, the terminal being provided in the second base portion, the first base portion being fixed by a layer of the adhesive to the portion being measured, and the layer of the adhesive being not provided on the second base portion such that the second base portion is not fixed to the portion being measured.

2. The strain gauge according to claim 1, wherein
   the base member includes a third base portion that connects the first and second base portions in the longitudinal direction, and
   the layer of the adhesive extends from the first base portion to a position of the third base portion in the longitudinal direction.

3. The strain gauge according to claim 2, wherein
   the first wiring line extends from the resistance element, and the terminal extends from the first wiring line in the longitudinal direction, and
   a length of the first wiring line is larger than a length of the terminal in the longitudinal direction.

4. The strain gauge according to claim 3, wherein
   a length of the resistance element is larger than the length of the terminal in the longitudinal direction, and
   the length of the first wiring line is larger than the length of the resistance element in the longitudinal direction.

5. The strain gauge according to claim 4, wherein
   an object being measured, which constitutes the portion being measured, extends from the portion being measured to a position facing the second base portion, and
   the second base portion abuts the object being measured.

6. The strain gauge according to claim 4, wherein a predetermined space is provided between an object being measured, which constitutes the portion being measured, and the second base portion.

7. The strain gauge according to claim 6, wherein the terminal is provided on a surface of the base member which faces the portion being measured.

8. The strain gauge according to claim 4, wherein the terminal is connected to the second wiring line via a-solder.

9. The strain gauge according to claim 3, wherein
   an object being measured, which constitutes the portion being measured, extends from the portion being measured to a position facing the second base portion, and
   the second base portion abuts the object being measured.

10. The strain gauge according to claim 3, wherein a predetermined space is provided between an object being measured, which constitutes the portion being measured, and the second base portion.

11. The strain gauge according to claim 10, wherein the terminal is provided on a surface of the base member which faces the portion being measured.

12. The strain gauge according to claim 3, wherein the terminal is connected to the second wiring line via a-solder.

13. The strain gauge according to claim 2, wherein
   an object being measured, which constitutes the portion being measured, extends from the portion being measured to a position facing the second base portion, and
   the second base portion abuts the object being measured.

14. The strain gauge according to claim 2, wherein a predetermined space is provided between an object being measured, which constitutes the portion being measured, and the second base portion.

15. The strain gauge according to claim 14, wherein the terminal is provided on a surface of the base member which faces the portion being measured.

16. The strain gauge according to claim 2, wherein the terminal is connected to the second wiring line via a solder.

17. A robot comprising
   a robot arm equipped with a joint that enables the robot arm to move, and
   a strain gauge having a mounting structure for mounting the strain gauge on a portion being measured at the joint, the strain gauge detecting strain occurring in the portion being measured, the strain gauge comprising:
   a base member having a film or plate form;
   a resistance element provided on the base member;
   a first wiring line provided on the base member and connected to the resistance element;
   a terminal provided on the base member and connected to the first wiring line; and
   a second wiring line connected to the terminal, wherein
   the base member is partly fixed, by an adhesive and in the longitudinal direction of the portion being measured, to the portion being measured, and
   the base member includes a first base portion and a second base portion that are mutually separately positioned in the longitudinal direction, the resistance element being provided in the first base portion, the terminal being provided in the second base portion, the first base portion being fixed by a layer of the adhesive to the portion being measured, and the layer of the adhesive being not provided on the second base portion such that the second base portion is not fixed to the portion being measured.

18. The robot according to claim 17, wherein
   the base member includes a third base portion that connects the first and second base portions in the longitudinal direction, and
   the layer of the adhesive extends from the first base portion to a position of the third base portion in the longitudinal direction.

* * * * *